(12) United States Patent
Qian et al.

(10) Patent No.: US 9,667,580 B2
(45) Date of Patent: May 30, 2017

(54) MESSAGE DELIVERY MANAGEMENT

(75) Inventors: Dennis Qian, Shanghai (CN); Andreas Ljunggren, Vallingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 728 days.

(21) Appl. No.: 13/985,203

(22) PCT Filed: Feb. 14, 2011

(86) PCT No.: PCT/CN2011/000227
§ 371 (c)(1),
(2), (4) Date: Jan. 27, 2014

(87) PCT Pub. No.: WO2012/109764
PCT Pub. Date: Aug. 23, 2012

(65) Prior Publication Data
US 2014/0156771 A1 Jun. 5, 2014

(51) Int. Cl.
*G06Q 30/02* (2012.01)
*H04L 12/58* (2006.01)
(Continued)

(52) U.S. Cl.
CPC ......... *H04L 51/24* (2013.01); *G06Q 30/0241* (2013.01); *G06Q 30/0262* (2013.01); *H04L 51/14* (2013.01); *H04L 65/4069* (2013.01); *H04L 65/4092* (2013.01); *H04N 21/4882* (2013.01); *H04N 21/812* (2013.01);
(Continued)

(58) Field of Classification Search
CPC ..... G06F 15/16; G06F 17/3064; G06Q 30/02; G06Q 30/0258; G06Q 30/0241; G06Q 30/0262; H04L 45/00; H04L 63/02; H04L 29/06027; H04L 51/24; H04L 65/4069;
(Continued)

(56) References Cited

U.S. PATENT DOCUMENTS 7,305,442 B1 * 12/2007 Lundy ................ G06Q 30/02
455/412.1
8,566,817 B2 * 10/2013 Grundfast ............ G06F 15/16
705/14.4
(Continued)

FOREIGN PATENT DOCUMENTS

| CN | 101330665 A | 12/2008 |
|---|---|---|
| CN | 101925001 A | 12/2010 |
| WO | 2010091575 A1 | 8/2010 |

OTHER PUBLICATIONS

3GPP, "Digital cellular telecommunications system (Phase 2+); Universal Mobile Telecommunications System (UMTS); LTE; Open Service Access (OSA); Parlay X web services; Part 19: Multimedia streaming control (3GPP TS 29.199-19 version 9.0.0 Release 9)" ETSI TS 129 199-19 V9.0.0 (Jan. 2010), 33 pages.

(Continued)

*Primary Examiner* — Le H Luu
(74) *Attorney, Agent, or Firm* — Rothwell, Figg, Ernst & Manbeck, P.C.

(57) ABSTRACT

There is provided a method for delivering messages. The method comprises receiving a message for transmission to at least one mobile device. The method also comprises verifying a streaming connection status of the mobile device. The method further comprises delivering the message if said mobile device does not have an active streaming connection.

11 Claims, 3 Drawing Sheets

(51) Int. Cl.
*H04L 29/06* (2006.01)
*H04W 4/20* (2009.01)
*H04N 21/488* (2011.01)
*H04N 21/81* (2011.01)
*H04W 4/12* (2009.01)

(52) U.S. Cl.
CPC ............. *H04W 4/206* (2013.01); *H04L 51/38* (2013.01); *H04W 4/12* (2013.01)

(58) Field of Classification Search
CPC ............. H04L 65/4092; H04M 3/5235; H04Q 3/0029; H04N 21/812; H04W 4/206
See application file for complete search history.

(56) References Cited

U.S. PATENT DOCUMENTS

| | | | |
|---|---|---|---|
| 2003/0096625 | A1 | 5/2003 | Lee et al. |
| 2003/0140149 | A1* | 7/2003 | Marejka ................. H04L 63/02 709/229 |
| 2004/0110535 | A1* | 6/2004 | Koskelainen ........ H04Q 3/0029 455/561 |
| 2004/0254998 | A1 | 12/2004 | Horvitz |
| 2005/0226201 | A1* | 10/2005 | McMillin ................ H04L 45/00 370/348 |
| 2006/0140388 | A1* | 6/2006 | Yamamoto .......... H04M 3/5235 379/265.01 |
| 2007/0004385 | A1 | 1/2007 | Horvitz et al. |
| 2007/0073585 | A1* | 3/2007 | Apple .................... G06Q 30/02 705/14.46 |
| 2007/0219949 | A1* | 9/2007 | Mekikian ........... G06Q 30/0258 |
| 2008/0056456 | A1* | 3/2008 | Erhart ............... H04L 29/06027 379/88.01 |
| 2008/0244040 | A1 | 10/2008 | Bhatia et al. |
| 2009/0006628 | A1 | 1/2009 | Webb et al. |
| 2010/0057687 | A1* | 3/2010 | Shen ................... G06F 17/3064 |
| 2011/0093783 | A1* | 4/2011 | Parra ..................... G06Q 30/02 715/719 |

OTHER PUBLICATIONS

3GPP, "Digital cellular telecommunications system (Phase 2+); Universal Mobile Telecommunications System (UMTS); LTE; Support of SMS over IP networks; Stage 3 (3GPP TS 24.341 version 9.1.0 Release 9)" ETSI TS 124 341 V9.0.0 (Jun. 2010), 32 pages.

3GPP, "3rd Generation Partnership Project; Technical Specification Group Core Network and Terminals; Open Service Access (OSA); Parlay X Web Services; Part 5: Multimedia messaging (Release 9)", 3GPP TS 29.199-5 V9.0.0 (Dec. 2010), pp. 1-36.

3GPP, "3rd Generation Partnership Project; Technical Specification Group Core Network and Terminals; Open Service Access (OSA); Parlay X Web Services; Part 4: Short messaging (Release 9)", 3GPP TS 29.199-4 V9.0.0 (Dec. 2010), pp. 1-38.

3GPP, "Digital cellular telecommunications system (Phase 2+); Universal Mobile Telecommunications System (UMTS); LTE; Transparent end-to-end packet-switched streaming service; Stage 1 (3GPP TS 22.233 version 8.0.0 Release 8)" ETSI TS 124 341 V8.0.0 (Feb. 2010), pp. 1-15.

Supplementary European Search Report issued in corresponding European application No. 11858837 on Jun. 11, 2014, 3 pages.

First Office Action issued on Mar. 26, 2016 in corresponding Chinese Application No. 201180067514.3, 11 pages (English translation only).

Second Office Action issued on Nov. 11, 2016, in corresponding Chinese application No. 201180067514.3 with English translation, 16 pages.

* cited by examiner

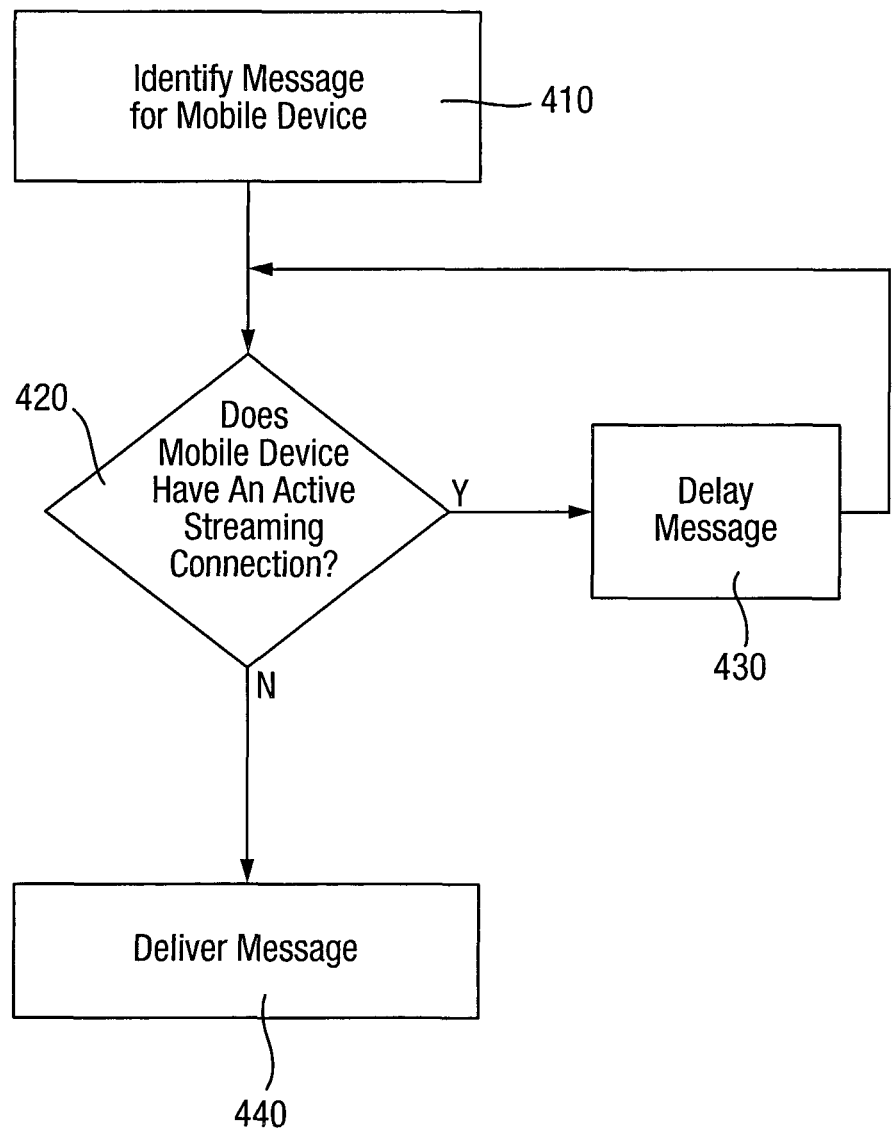

MESSAGE DELIVERY MANAGEMENT

CROSS-REFERENCE TO RELATED APPLICATION

This application is a 35 U.S.C. §371 National Phase Entry Application from PCT/CN2011/000227, filed Feb. 14, 2011, and designating the United States.

TECHNICAL FIELD

The present application relates to a method for delivering messages, a message delivery platform, a network node, and a computer-readable medium.

BACKGROUND

The 3GPP Packet Streaming Service (PSS) is defined in 3GPP TS 22.233 v8.0.0, titled Transparent end-to-end packet-switched streaming service, stage 1, and is incorporated herein by reference. PSS provides the ability to stream multimedia content including audio and video to mobile devices. PSS normally takes time ranging from several minutes to hours to stream a particular piece of content to the mobile device, dependent upon the nature of the content. Examples of such content are: news items, trailers, television programs, sports games, music videos and movies. It is common for a mobile device that can stream content to also provide other services including telecommunication services like voice call, short message service (SMS) and multimedia message service (MMS).

Mobile advertising makes use of SMS or MMS as a means of pushing information concerning products and services to user groups of interest. However, an advertising message delivered to a mobile device would be considered intrusive or disruptive if delivered while a user was using the mobile device for some other purpose. Further, an advertising message is more likely to be ignored by the user if it is delivered in the background while a user is using the mobile device for another activity such as receiving streamed content.

To overcome these problems with receiving advertising messages, a user could deactivate any notifications of incoming communications, but this would have the possibly undesirable affect of preventing the user from receiving all communications, including user-to-user communications not just the advertising messages.

Thus, there is required a system for managing delivery of advertising messages.

SMS is described in numerous 3GPP technical specifications:
  23.040 v9.1.0, titled "Technical Realization of SMS";
  23.233 v8.0.0, titled "Transparent end-to-end packet-switched streaming service, stage 1"; and
  29.199 v9.0.0, (referred to herein as the 29.199 specification) describes SMS OSA (Open Services Architecture) APIs (Application Programming Interfaces), multimedia streaming OSA APIs, and MMS;
  all of which are incorporated herein by reference.

SUMMARY

There is provided a method for delivering messages. The method comprises receiving a message for transmission to at least one mobile device. The method also comprises verifying a streaming connection status of the mobile device. The method further comprises delivering the message if said mobile device does not have an active streaming connection.

There is no widely accepted procedure regarding how to deal with the inter-operation between SMS and PSS. When an SMS is to be delivered to a terminal but that terminal is engaged in streaming playback, possible approaches in the network include:
  1) pause the streaming, deliver the SMS and then resume the streaming and continue the playback;
  2) tear down the streaming, deliver the SMS and then setup the streaming again and restart the playback; or
  3) tear down the streaming, deliver the SMS but then do not restart the playback.

An alternative approach which may be implemented in the terminal is to keep the streaming session ongoing and implement a short message buffering mechanism in the terminal software. This would allow a user to pre-select how the terminal handles an incoming SMS/MMS when viewing a PSS: dismiss it or read it at once. However this solution is a better fit for user-to-user short messages. For a platform initiated advertising message, dismissing it will mean that it likely goes unread, or is delivered when the user has moved to a different location and the message is no longer relevant. A better solution, which is disclosed herein, is for the mobile advertising platform to probe the device status and intelligently determine to deliver the mobile advertising message after the PSS session is finished.

This has a further advantage that when the PSS session finishes the mobile advertising platform may review whether the advertising message is still relevant to the mobile device before initiating delivery of the message. This is particularly relevant if the advertising message was location based as the mobile device may have changed location during the course of the PSS session.

There is further provided a message delivery platform. The message delivery platform is arranged to receive a message for transmission to at least one mobile device. The message delivery platform is also arranged to verify a streaming connection status of the mobile device. The message delivery platform is arranged to deliver the message if said mobile device does not have an active streaming connection.

There is further provided a network node arranged to receive a subscription request from a message delivery platform, said subscription request identifying at least one mobile device. The network node is further arranged to send a streaming session status message to the message delivery platform when the status of a streaming connection to the at least one mobile device changes.

There is further still provided a computer-readable medium, carrying instructions, which, when executed by computer logic, causes said computer logic to carry out any of the methods disclosed herein.

The method and apparatus disclosed herein allow for the verification of a mobile device's content streaming status before a message is delivered to the mobile device. This allows the message to be delivered at a more optimal time. This benefits the user of the mobile device because their streaming session is not interrupted by advertising messages, yet the user can still receive messages from other users. This also benefits the advertiser in that there is an increased likelihood that the advertising message will be given proper consideration by the user.

BRIEF DESCRIPTION OF THE DRAWINGS

A method and apparatus for improved message delivery management will now be described, by way of example only, with reference to the accompanying drawings, in which:

FIG. 4 is a flow diagram illustrating a method disclosed herein.

DETAILED DESCRIPTION

The method and apparatus disclosed herein implements a probing capability in a mobile advertising platform which subscribes to a terminal status update service in respect of the mobile devices streaming connection status. Only when the device is not serving a PSS can the mobile advertising platform deliver the SMS/MMS based advertisement.

Use is made of various Parlay X Web Services interfaces to be aware of multimedia streaming status, and deliver SMS/MMS ads accordingly. Part 19 of the 29.199 specification defines multimedia streaming control web services interfaces, including notification management which is of relevance here. Sections 4 and 5 of the 29.199 specification define SMS/MMS delivery interfaces employed by Mobile advertising platforms.

Figure 1:
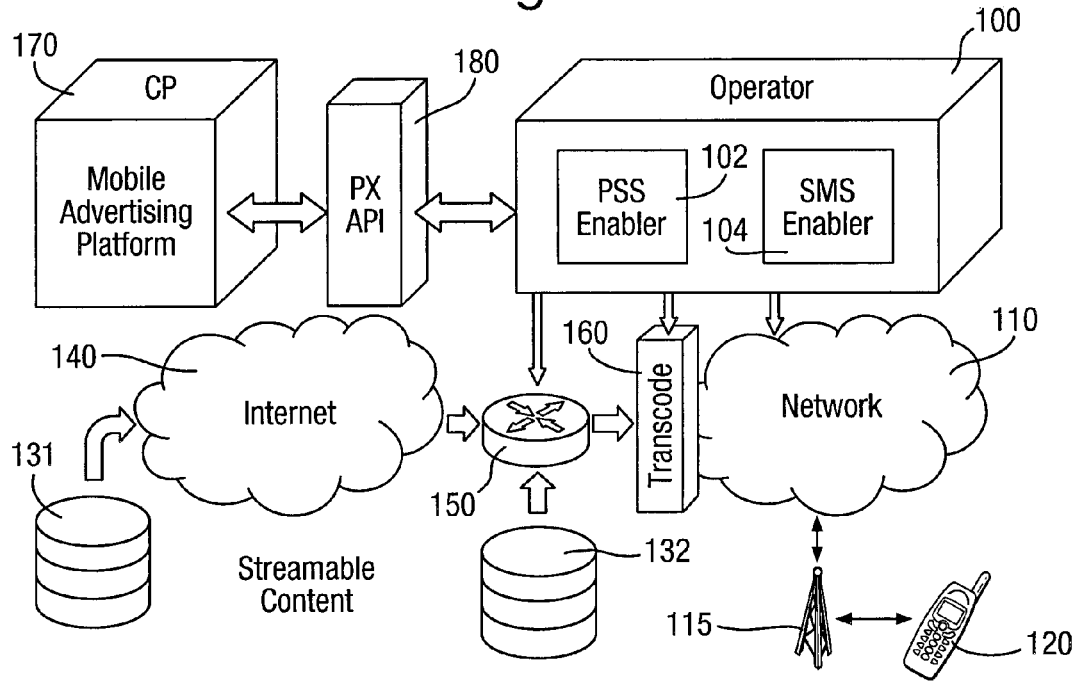
FIG. 1 illustrates a network architecture incorporating a mobile advertising platform.

FIG. 1 illustrates a network architecture incorporating a mobile advertising platform. An operator 100 runs a network 110 which includes at least one base station 115 for communicating with at least one mobile device 120. The operator 100 includes a PSS enabler 102 and an SMS enabler 104. The operator 100 may also include an MMS Enabler (not shown in FIG. 1) which functions to deliver MMS in much the same way that SMS enabler 104 delivers SMS. The PSS enabler 102 manages the delivery of streamable content from servers 131 and 132. Streamable content may be delivered from a remote server 132 over the internet 140 or from a local server 132 via local routing equipment 150. A transcoder 160 transcodes the streamable content for the mobile device 120 prior to delivery of the streamable content over the network 110. A mobile advertising platform 170 is arranged to interface with the operator 100 via a Parlay X web service interface, PX API 180. It should be noted that any appropriate API (application programming interface) may be used instead of Parlay X, such as OneAPI.

In operation, streamable content may be delivered to the mobile device 120 the streaming controlled by the PSS enabler 102. Before the mobile advertising platform 170 attempts to deliver an advertising message to a particular mobile terminal 120, it queries the PSS connection status of the mobile terminal 120 via a multimedia streaming notification manager, which is one part of the PX API's 180. The operation of the architecture shown in FIG. 1 will be described in more detail with reference to the further figures.

Figure 2:
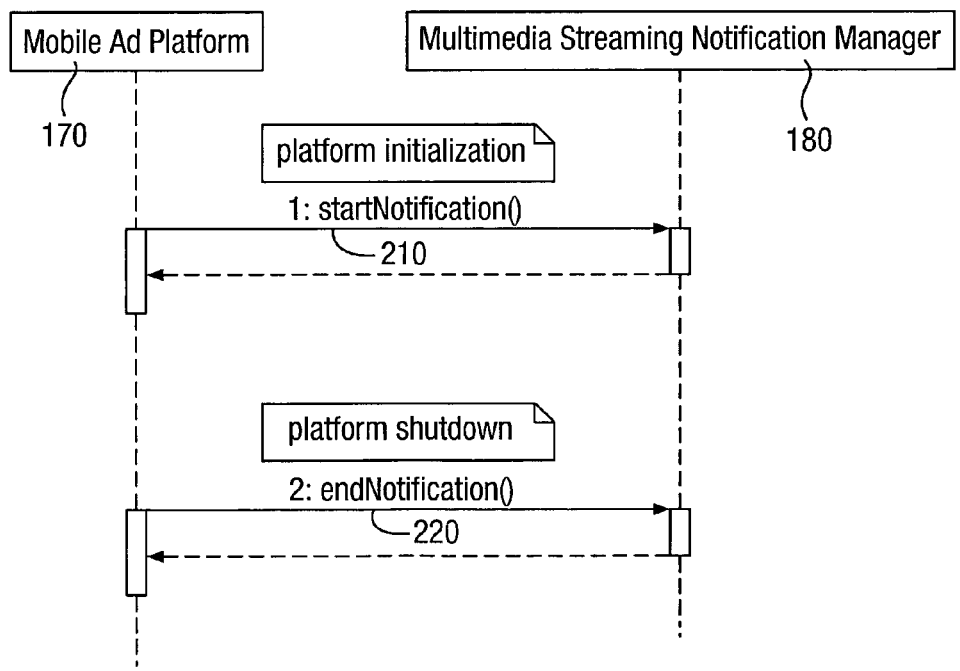
FIG. 2 shows a subscription process for the mobile advertising platform.

FIG. 2 shows a subscription process for the mobile advertising platform to obtain PSS connection status information from the operator 100 via the multimedia streaming notification manager 180. The mobile advertising platform 170 subscribes to the multimedia streaming notification manager 180. Once the subscription is in place, the mobile advertising platform 170 receives, via the multimedia streaming notification manager 180, notification of any successful PSS initiation, establishment and termination. The subscription process may be initiated during initialization of a mobile advertising application in the mobile advertising platform 170. Upon mobile advertising application initialization, the mobile advertising platform 170 starts the subscription process by sending a "startNotification" message 210 to the multimedia streaming notification manager 180. The "startNotification" message 210 contains a "reference" variable which defines the address to which the status notices should be reported, this is usually the network address of the mobile advertising platform 170. The "startNotification" message 210 also contains a "frequency" variable which determines how frequently the status is reported by the multimedia streaming notification manager 180. The frequency variable is set according to content provider policy.

While the subscription service is active, the mobile ad platform receives packet streaming service connection status notifications from the multimedia streaming notification manager 180. When the mobile advertising application is shutdown, the subscription service is deactivated by sending a message "endNotification" 220 from the mobile advertising platform 170 to the multimedia streaming notification manager 180.

After setting up the packet streaming service status notification subscription service for particular mobile device s 120, the mobile advertising platform 170 can get real time notification of packet streaming service events for the particular mobile devices 120. When an SMS/MSS advertisement is to be delivered to a mobile device 120, and no active session is ongoing for that user, the ad is delivered immediately by using a SendSms or SendMessage process and the SMS enabler 104 of the operator 100.

Figure 3:
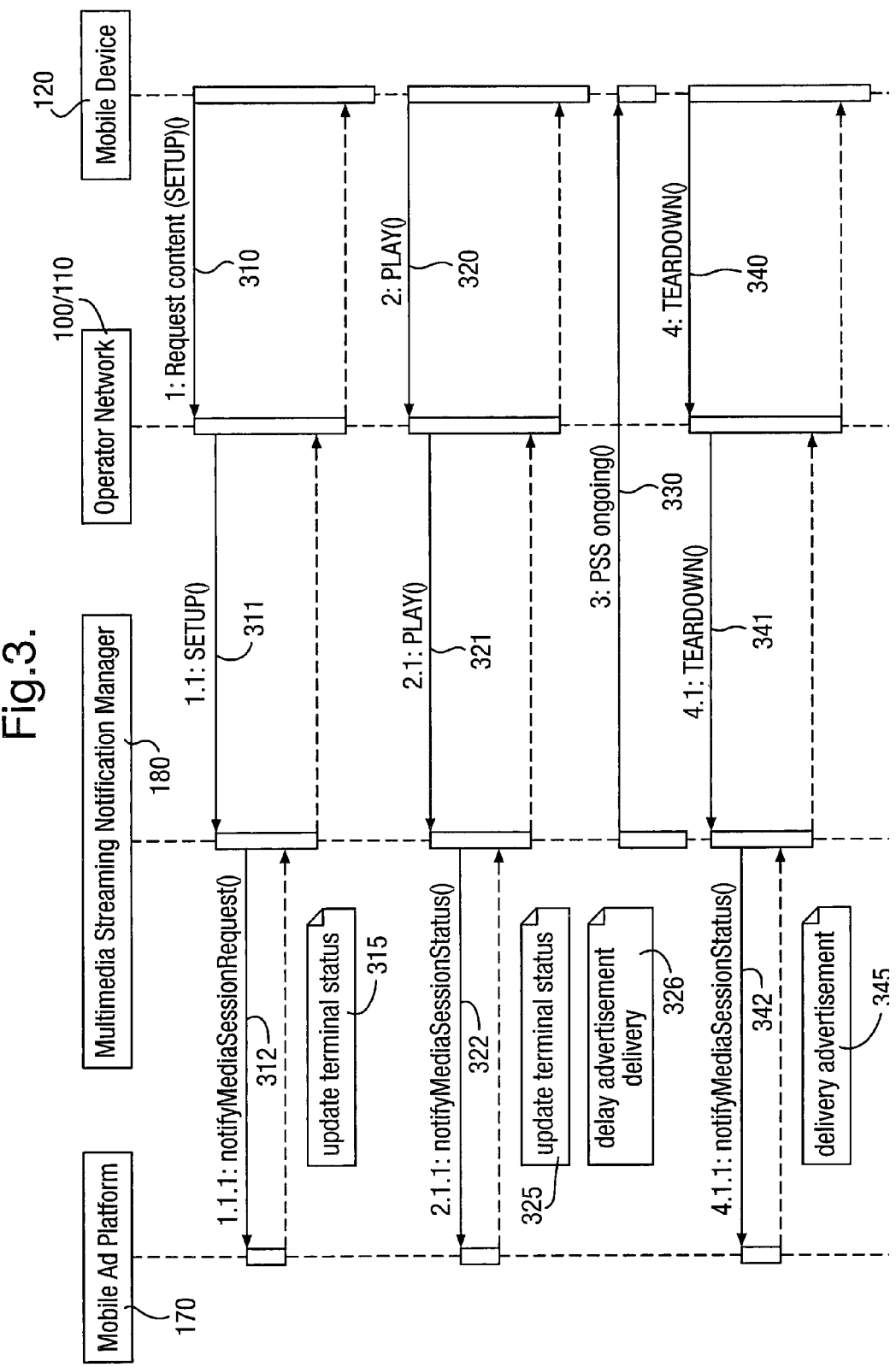
FIG. 3 illustrates the messages passing between certain elements of FIG. 1.

The operation of the system shown in FIG. 1 will now be described with reference to the signaling diagram of FIG. 3. The signaling diagram of FIG. 3 illustrates the messages passing between mobile device 120, the operator network 100,110, the multimedia streaming notification manager 180, and the mobile advertising platform 170.

A mobile device 120 sends a set-up message 310 to the operator's network 100,110 requesting content via a packet streaming service. In response to the set-up message 310, the operator network 100,110 sends a set-up notification message 311 to the multimedia streaming notification manager 180. The operator network 100,110 also arranges for the appropriate packet streaming service connection to be made with mobile device 120. Upon receipt of the set-up notification message 311, the multimedia streaming notification manage 180 sends a notify media session request message 312 to mobile at platform 170. Upon receipt of message 312, mobile advertising platform 170 updates 315 the terminal status stored therein.

Subsequently, the mobile device 120 begins playback of the requested content. To do this, a play message 320 is sent from the mobile device 120 to the operator network 100,110. Upon receipt of the play message 320, the operator network 100,110 sends a play notification message 321 to the multimedia streaming notification manager 180. Upon receipt of the play notification message 321, the multimedia streaming notification manager 180 sends notify media session status message 322 to mobile advertising platform 170. Upon receipt of the notify message 322, mobile advertising platform 170 updates 325 the terminal status.

While the mobile device 120 is receiving streamed content, the packet streaming service is ongoing 330. While the packet streaming service is ongoing 330, mobile advertising platform 170 identifies an advertisement message which can be delivered to mobile device 120. However, because of the packet streaming service is ongoing 330 the mobile advertising platform 170 delays delivery of the advertisement message 326.

Subsequently, the mobile device 120 ceases the packet streaming service and sends a tear down message 340 to the operator network 100,110. Upon receipt of the tear down message 340 the operator network 100,110 sends a tear down notification 341 to the multimedia streaming notification manager 180. Upon receipt of the notification, the multimedia streaming notification manager 180 sends a notify media session status message 342 to the mobile advertising platform 170. Notify message 342 instructs the mobile advertising platform 170 that the mobile device 120 no longer has an active packet streaming service connection and in response thereto, the mobile advertising platform 170 determines that the advertising message previously identified as relevant to the mobile device 120 may now be delivered and if the advertising message is still relevant to mobile device 120, the mobile advertising platform 170 initiates delivery 345 of the advertising message 345 to mobile device 120.

The notify messages 312, 322, 342 sent from multimedia streaming notification manager 180 to mobile advertising platform 170 contain a "subscriberIdentifier" variable which is used to link the activity being notified to an advertisement target mobile device 120. The subscriber identifier may take the form of MSISDN, IMSI or any other form enforced by a service provider.

In summary, if a mobile device 120 requests a packet streaming service, then in addition to serving the session setup request, the network 110 notifies the mobile advertising platform 170 of the request via the multimedia streaming notification manager 180. Then the SMS/MMS advertising message is not delivered until the mobile advertising platform 170 receives notification of the streaming teardown event in the form of notify media session status message 342.

Even if a PSS session is paused, Mobile Ad will not be delivered to the end-user because it is not known whether or not the session is likely to be resumed before the advertising message is delivered.

The method and apparatus disclosed herein empower the mobile advertising message provider to enhance the efficiency of their service. At the same time, the experience of end-users is improved because their PSS experience is not interrupted by incoming mobile advertising messages.

FIG. 4 is a flow diagram illustrating a method disclosed herein. A mobile advertising platform identifies 410 a message for transmission to a mobile device. Before sending the message to the mobile device the mobile advertising platform queries an internal database to determine 420 the present streaming connection status of the mobile device. If the mobile device has an active streaming connection, then the mobile advertising platform delays 430 delivery of the message. If the mobile device does not have an active streaming connection, then the mobile advertising platform sends 440 the message to the mobile device.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

Further, while examples have been given in the context of particular communications standards, these examples are not intended to be the limit of the communications standards to which the disclosed method and apparatus may be applied. For example, while specific examples have been given in the context of LTE, the principles disclosed herein can also be applied to a CDMA system, other wireless communication system, and indeed any communication system which allows streaming connections. For example, similar functionality can be introduced in 2G or 3G networks via detecting PDP-Context to prevent the interruption of browser sessions. In such a case the protection against long-lived PDP-contexts, such as continuous music streaming, may be added as it may be desired that these services should not block delivery of an advertisement message.

The invention claimed is:

1. A method for delivering messages, the method comprising:
receiving a message for transmission to a mobile device;
determining a video streaming connection status of the mobile device, wherein determining the video streaming connection status of the mobile devices comprises determining whether a video is currently being streamed to the mobile device or is about to be streamed to the mobile device; and
based on the determined video streaming connection status, performing one of a first message delivery option and a second message delivery option, wherein the first message delivery option is delivering the message to the mobile device and the second message delivery option is to delaying delivery of the message, wherein
the method is performed by an advertising platform,
the method further comprises, before receiving the message, the advertising platform transmitting to a streaming notification manager a notification request that causes the streaming notification manager to transmit to the advertising platform a notification message in the event that the streaming notification manager detects that the mobile device has requested to receive streaming video content.

2. The method of claim 1, further comprising receiving notification of streaming connection status changes for the at least one mobile device.

3. The method of claim 2, wherein the streaming connection status changes comprise notification of streaming connection setup and notification of streaming connection teardown.

4. The method of claim 1, wherein the message is an advertising message.

5. The method of claim 1, wherein the message for transmission is received with a flag set, the flag identifying the message is to be delivered to the at least one mobile device when said mobile device does not have an active streaming connection.

6. The method of claim 1, wherein the message for transmission is received with a flag set, the flag identifying the message as an advertising message.

7. The method of claim 1, wherein the streaming connection is at least one of: a Packet Streaming Service; and a Packet Data Protocol context.

8. A message delivery platform arranged to:
receive a message for transmission to a mobile device;
determine a streaming connection status of the mobile device, wherein the streaming connection status indicates whether a video is currently being streamed to the mobile device or is about to be streamed to the mobile device;
deliver the message to the mobile device without delay if the streaming connection status indicates that no video is currently being streamed to the mobile device or is about to be streamed to the mobile device; and delay delivery of the message if the streaming connection status indicates that a video is currently being streamed to the mobile device or is about to be streamed to the mobile device wherein the message delivery platform is arranged such that, before the message delivery platform receives the message for transmission to the mobile device, the message delivery platform transmits to a streaming notification manager a notification request that causes the streaming notification manager to transmit to the message delivery platform a notification message in the event that the streaming notification manager detects that the mobile device has requested to receive streaming video content.

9. The message delivery platform of claim 8, further arranged to receive notification of streaming connection status changes for the at least one mobile device from a streaming notification manager.

10. The message delivery platform of claim 8, wherein the streaming connection status changes comprise notification of streaming connection setup and notification of streaming connection teardown.

11. A non-transitory computer-readable medium storing instructions, which, when executed by computer logic, causes said computer logic to carry out a method comprising:

receiving a message for transmission to a mobile device;

determining a video streaming connection status of the mobile device, wherein determining the video streaming connection status of the mobile devices comprises determining whether a video is currently being streamed to the mobile device or is about to be streamed to the mobile device; and based on the determined video streaming connection status, performing one of a first message delivery option and a second message delivery option, wherein the first message delivery option is delivering the message to the mobile device and the second message delivery option is to delaying delivery of the message, wherein the method is performed by an advertising platform, the method further comprises, before receiving the message, the advertising platform transmitting to a streaming notification manager a notification request that causes the streaming notification manager to transmit to the advertising platform a notification message in the event that the streaming notification manager detects that the mobile device has requested to receive streaming video content.

\* \* \* \* \*